United States Patent [19]
Monaghan

[11] Patent Number: 6,152,253
[45] Date of Patent: Nov. 28, 2000

[54] DRIVE TRAIN SYSTEM FOR A CONSTRUCTION-TYPE VEHICLE

[75] Inventor: Merrick O. Monaghan, Yankton, S. Dak.

[73] Assignee: Gehl Company, West Bend, Wis.

[21] Appl. No.: 09/067,559

[22] Filed: Apr. 28, 1998

[51] Int. Cl.$^7$ .............................. B60K 5/02; B60K 17/34
[52] U.S. Cl. ........................... 180/291; 180/377; 180/312
[58] Field of Search .................................. 180/291, 292, 180/374, 375, 376, 377, 312; 280/781

[56] References Cited

U.S. PATENT DOCUMENTS

| | | | |
|---|---|---|---|
| 3,677,358 | 7/1972 | Luft | 180/292 |
| 5,618,156 | 4/1997 | Brown | 414/694 |
| 5,687,809 | 11/1997 | Braud | 180/297 |
| 5,707,202 | 1/1998 | Brown | 414/685 |
| 5,727,921 | 3/1998 | Brown | 414/694 |

*Primary Examiner*—Paul N. Dickson
*Attorney, Agent, or Firm*—Andrus, Sceales, Starke & Sawall, LLP

[57] ABSTRACT

A drive train arrangement for a construction-type vehicle having a central frame member includes an engine, a transmission, and a transfer case extending between and interconnecting the engine and the transmission. The vehicle includes a side frame assembly which extends laterally from the central frame member, and which defines a drive train receiving space within which the engine, transmission and transfer case are received. A second side frame assembly extends laterally from the central frame member in an opposite direction, and is adapted to support an operator cab. The engine and the transmission extend along longitudinal axes which are substantially parallel to each other, and the transfer case drivingly interconnects the engine output with the transmission input. The transmission is drivingly engaged with a pair of drive shafts, which extend along a longitudinal axis coincident with the longitudinal axis of the central frame member. The engine, transmission and transfer case are assembled into a subassembly by interconnecting a mounting member with the transmission and the engine at a location spaced from the transfer case, and the subassembly is mounted to the central frame member and the side frame assembly as a unit.

25 Claims, 4 Drawing Sheets

DRIVE TRAIN SYSTEM FOR A CONSTRUCTION-TYPE VEHICLE

BACKGROUND AND SUMMARY OF THE INVENTION

This invention relates to vehicles, and more particularly to an arrangement and mounting system for the drive train of a vehicle.

A construction-type vehicle such as an extendible boom forklift typically includes a central frame member which extends along a longitudinal axis in a front-rear direction. A pair of steerable driven wheels are mounted to an axle, which in turn is mounted toward the rearward end of the central frame member. A pair of steerable driven wheels are also mounted to the central frame member toward its forward end. A pair of uprights extend from the rearward end of the central frame member rearwardly of the rear axle, and an extendible boom assembly is pivotably mounted to and between the uprights. The extendible boom terminates in a forward end located forwardly of the front wheels, and is raised and lowered relative to the central frame member by extendible and retractable hydraulic cylinders interconnected between the extendible boom assembly and the central frame member.

In a vehicle such as this, it has been known to mount the engine on the central frame member, so that the engine output is coincident with the centerline of the vehicle as defined by the longitudinal axis of the central frame member. A transmission is also mounted to the central frame member, defining an input and an output which lie along the centerline of the machine, and the transmission is drivingly interconnected with the engine output. The cab is supported off the side of the central frame member, and thus has a relatively narrow width limited by the amount of space between the side of the central frame member and the outer extent of the wheels.

An increase in the width of the cab has been found to enhance the ergonomics involved in operation of the vehicle. However, since the location of the outer extent of the cab is dictated by the outer extent of the wheels, any increase in cab width thus requires more of the cab to be located more toward the centerline of the vehicle. The increased space requirements for the cab thus encroaches on the space typically occupied by the engine and transmission in the prior art configuration.

It is an object of the present invention to provide a system for mounting a drive train, including an engine and a transmission, in a vehicle having a central frame member, in which the engine and transmission are placed so as to accommodate a relatively wide operator cab mounted to the central frame member. Another object of the invention is to provide a drive train mounting system which minimizes the height of the compartment within which the engine is mounted, and which does not alter the overall width of the vehicle or adversely effect the turning angle of the front wheels. Yet another object of the invention is to provide a drive train arrangement which can be made into a subassembly which is mounted as a unit to the frame or other support structure of the vehicle. A further object of the invention is to provide a drive train mounting arrangement which accommodates placement of a cooling system directly adjacent the engine. A still further object of the invention is to provide a drive train mounting arrangement which provides input power to the driven wheels along the centerline of the vehicle.

In accordance with one aspect of the invention, a power system or drive train for a vehicle having a central frame member extending along a longitudinal axis in a front-rear direction includes a drive train support structure mounted to the central frame member, an engine mounted to the support structure and including an output, and a transmission mounted to the central frame member. The engine is laterally offset relative to the longitudinal axis of the central frame member, and the transmission includes an input and an output lying along an axis coincident with the longitudinal axis of the central frame member. A power transfer arrangement extends between and drivingly interconnects the engine output and the transmission input, for providing power to the transmission from the engine. The support structure is preferably in the form of a frame assembly mounted to the central frame member and extending laterally therefrom. The support structure and the central frame member cooperate to define a drive train mounting area or space within which the drive train components are received. The central frame member defines a forward portion and a rearward portion, and the support frame assembly is located between the central frame member forward and rearward portions. The forward and rearward portions of the central frame member each preferably define an internal passage. The transmission output is interconnected with a front drive shaft which extends into and through the internal passage in the forward portion of the central frame member, and with a rear drive shaft which extends into and through the internal passage in the rearward portion of the central frame member. The central frame member preferably includes a side wall extending between and forming a part of each of the central frame member forward and rearward portions, and the support frame assembly extends laterally from the side wall. The engine and the transmission are oriented in a side-by-side configuration, and the engine preferably extends along a longitudinal front-rear axis substantially parallel to the longitudinal axis of the transmission input and output. The transmission input is located at a first end of the transmission for interconnection with the power transfer arrangement, and power is output from both ends of the transmission through the front and rear drive shafts. The engine output is located at one end of the engine, which is laterally spaced from the input end of the transmission. The power transfer arrangement preferably includes a power transfer casing which is operable to structurally interconnect the output end of the engine with the input end of the transmission. The power transfer casing is mounted at one end to the support frame assembly, and is mounted at its opposite end to the side wall defined by the central frame member. A mounting member extends between and interconnects the engine and the transmission at a location spaced from the power transfer casing. The mounting member extends under the transmission, and defines an end which is mounted to the central frame member side wall. The engine is secured to an opposite end defined by the mounting member. A separate mounting member is interconnected between the engine and the support frame assembly at a location spaced from the power transfer casing.

In accordance with another aspect of the invention, a vehicle includes a central frame member carrying at least one, and preferably two, sets of driven wheels, and extending along a longitudinal axis in a front-rear direction. A pair of side frame assemblies are mounted to the central frame member, extending laterally therefrom in opposite directions. An operator cab is mounted to a first one of the side frame assemblies, and an engine is mounted to a second one of the side frame assemblies. The engine includes an output, and extends along a front-rear axis laterally offset from the longitudinal axis of the central frame member. A transmission is interconnected with the central frame member, and includes an output drivingly interconnected with the set of driven wheels. The transmission includes an input laterally offset from the engine output, and a power transfer arrangement is interposed between and drivingly interconnected with the engine output and the transmission input for supplying power to the transmission from the engine. The inner extent of the operator cab is located immediately adjacent the central frame member and the transmission, such that the engine is spaced laterally outwardly from the inner end of the operator cab. Details of this aspect of the invention are as summarized above.

In accordance with yet another aspect of the invention, a drive train system for a vehicle includes an engine extending along a longitudinal axis and having an output, a transmission having an input and extending along a longitudinal axis substantially parallel to the longitudinal axis of the engine and laterally offset from the engine, and a power transfer arrangement interposed between and drivingly interconnected with the engine output and the transmission input. The engine and the transmission are preferably arranged in a side-by-side manner. The engine output is located at a first end defined by the engine, and the transmission input is located at a first end defined by the transmission. The power transfer arrangement is interconnected with the first ends of the engine and transmission. The transmission defines a second end opposite its first end, and includes an output located at its first end and an output located at its second end. The power transfer arrangement preferably includes a casing mounted to the first end of the engine and to the first end of the transmission, and the power transfer casing is operable to structurally interconnect the engine and the transmission. A structural mounting member is spaced from the power transfer casing, and is also operable to structurally interconnect the engine and the transmission. In this manner, the engine, transmission and power transfer arrangement are interconnected into a subassembly which can be mounted to the vehicle frame as summarized above.

The invention also contemplates a method of mounting a power system or drive train to a vehicle, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION

Figure 1:
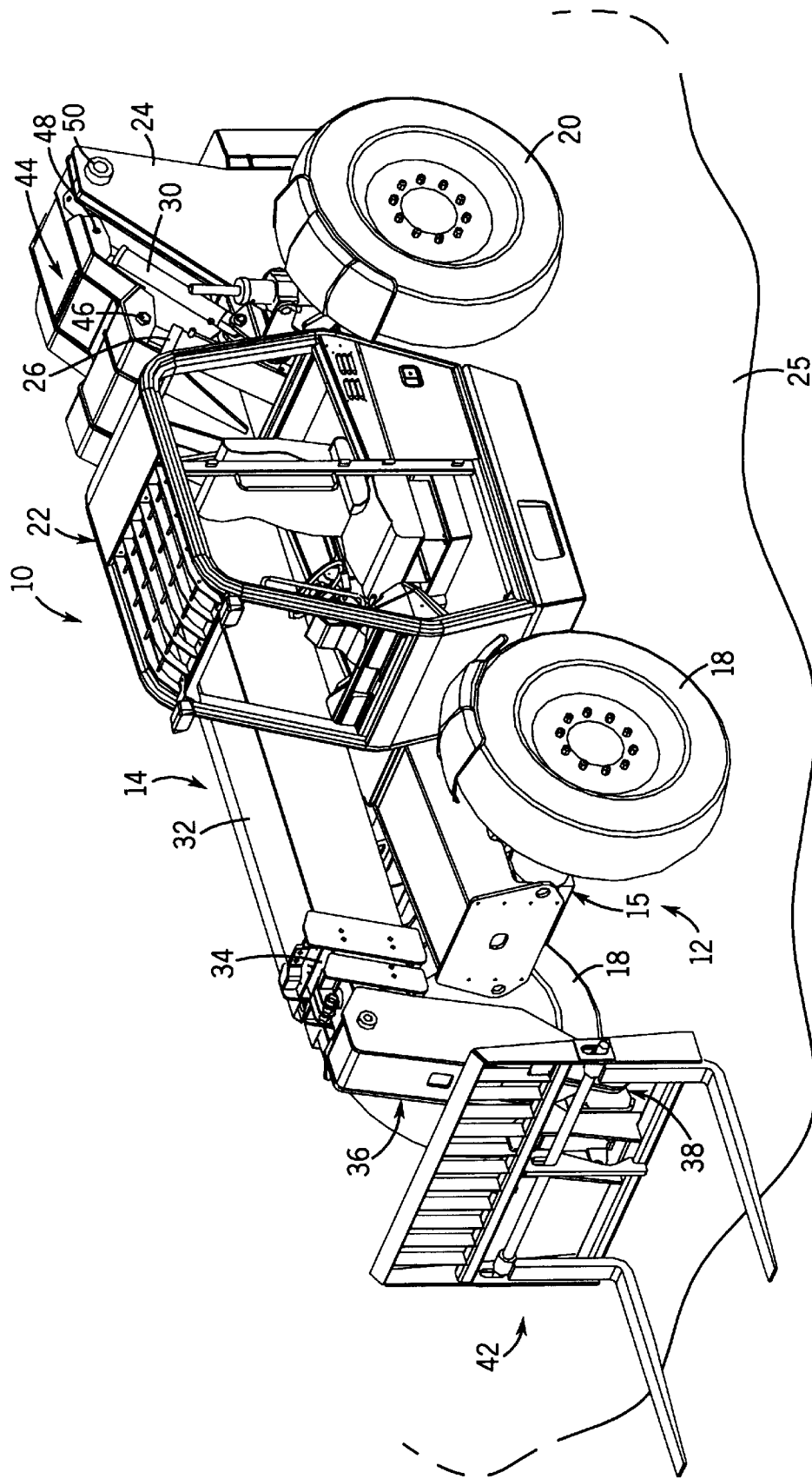
FIG. 1 is an isometric view of a vehicle, in the form of an extendible boom forklift, incorporating the drive train mounting system of the present invention.

Referring to FIG. 1, an extendible boom forklift 10 generally includes a chassis 12 and a boom assembly 14 mounted to chassis 12. Chassis 12 includes a central frame member 15 extending in a longitudinal front-rear direction. A pair of front ground-engaging wheels 18 are mounted toward the forward end of central frame member 15, and a pair of rear ground-engaging wheels 20 are mounted toward the rearward end of central frame member 15. A cab 22 is mounted between front wheels 18 and rear wheels 20 on one side of central frame member 15, and a drive train is mounted on the side of central frame member 15 opposite cab 22, in a manner to be explained.

A pair of uprights 24 are mounted central to frame member 15 toward its rearward end, rearwardly of cab 22 and wheels 20. A pair of lift cylinders 26 are located one on either side of frame 16, and each lift cylinder 26 is connected to chassis 12 via a pivot connection which pivotably secures the cylinder end of lift cylinder 26 to chassis 12 for movement about a substantially horizontal pivot axis. A pair of slave cylinders 30 are also, located one on either side of chassis 12, and the cylinder end of each slave cylinder 30 is connected to chassis 12 via a pivot connection which provides pivoting movement of cylinder 30 about a substantially horizontal pivot axis.

Boom assembly 14 generally includes an outer boom member 32 and an intermediate boom member 34 which is received within an internal passage defined by outer boom member 32 for telescoping inward and outward movement relative to outer boom member 32. Boom assembly 14 further includes an inner boom member received within an internal passage defined by intermediate boom member 34 and mounted for axial inward and outward telescoping movement relative to intermediate boom member 34. A nose section 36 is mounted to the forward end of the inner boom member, and is located forwardly of the forward end of chassis 12. A drive arrangement provides inward and outward movement of intermediate boom member 34 and the inner boom member to which nose section 36 is mounted, in a manner as is known.

A tool mounting assembly 38 is pivotably mounted to the lower end of nose section 36, and a tilt cylinder (not shown) is interposed between nose section 36 and tool mounting assembly 38. Tool mounting assembly 38 includes an arrangement for releasably engaging a tool with boom assembly 14 through nose section 36. As shown in the drawings, the tool is in the form of a fork assembly 42, although it is understood that any other tool as desired can be mounted to tool mounting assembly 38.

Boom assembly 14 includes a mounting structure 44 toward its rearward end. Lift cylinder 26 is engaged with mounting structure 44 via a pivot connection 46, and slave cylinder 30 is connected to mounting structure 44 via a pivot connection 48. A pivot shaft 50 is operable to pivotably mount boom assembly 14 to uprights 24 through mounting structure 44. Boom assembly 14 is pivotable about a pivot axis defined by the longitudinal axis of pivot shaft 50.

With the arrangement as described above, boom assembly 14 is operable to lift a load located forwardly of chassis 12 utilizing the tool, such as fork assembly 42, mounted to the forward end of boom assembly 14 forwardly of front wheels 18. Extension of lift cylinders 26 functions to pivot boom assembly 14 upwardly about pivot shaft 50 to lift the load carried by the tool, such as fork assembly 42, and likewise retraction of cylinders 26 functions to lower the load by allowing boom assembly 14 to pivot downwardly about pivot shaft 50.

Figure 2:
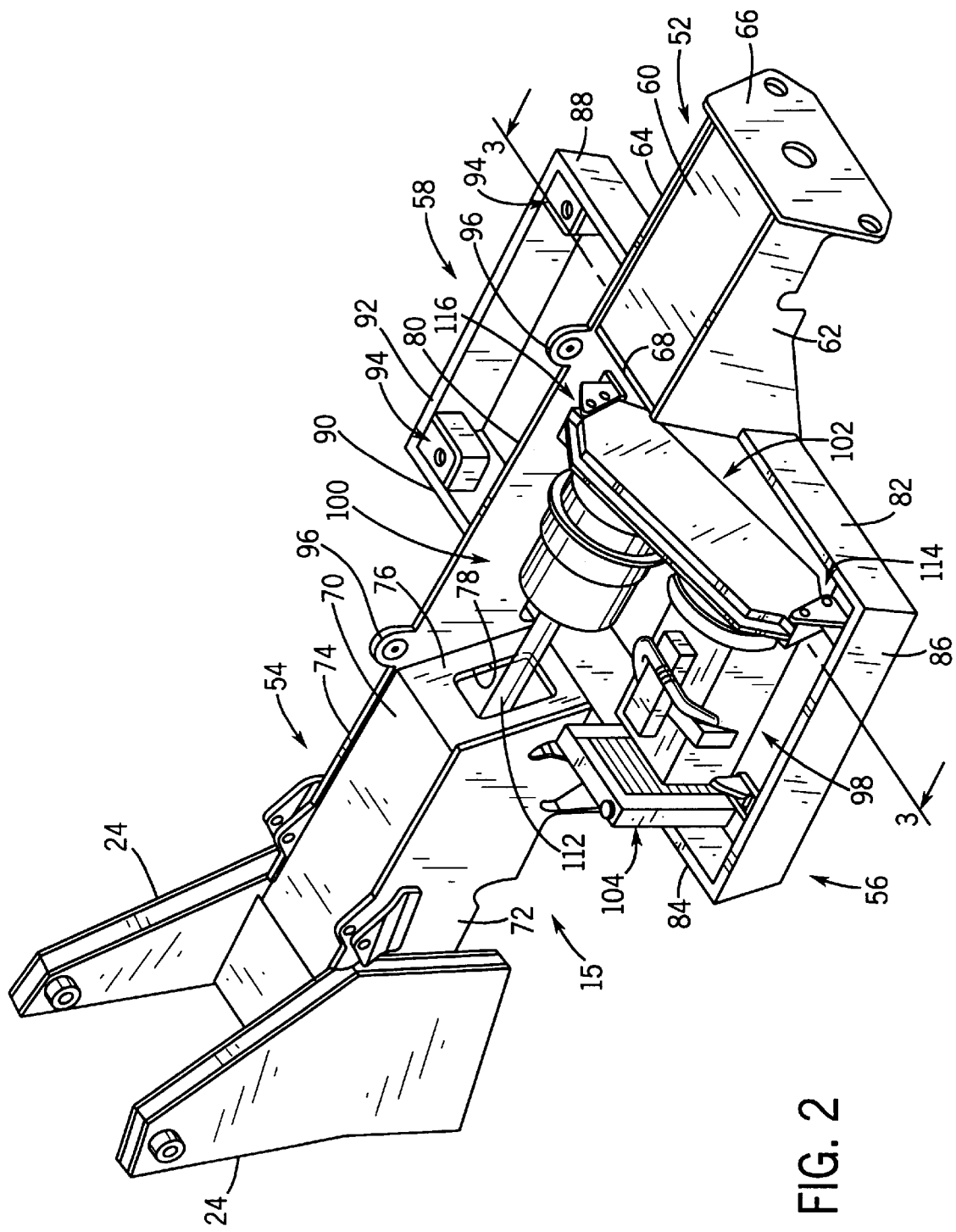
FIG. 2 is an isometric view of the frame assembly of the vehicle of FIG. 1, showing the manner in which the drive train is mounted to the vehicle frame assembly.

As shown in FIG. 2, central frame member 15 defines a forward or front section 52, a rear section 54, and a pair of side frame assemblies 56, 58 interposed between front section 52 and rear section 54. Uprights 24 are mounted one on either side of central frame member rear section 54. Front wheels 18 are mounted to opposite ends of a steerable axle carried by front section 52. Similarly, rear wheels 20 are mounted to opposite ends of an axle carried by rear section 54 and located forwardly of uprights 24.

Central frame member front section 52 defines a box-like cross section including a top wall 60, a pair of side walls 62, 64, and a bottom wall (not shown), which together define an internal passage. Front section 52 further includes a front end plate 66 and a rear end plate 68. Front end plate 66 is welded to the front end of each of top wall 60, side walls 62, 64, and the bottom wall of front section 52. Rear end plate 68 is welded to the rear end of each of top wall 60, side wall 62, and the bottom wall of front section 52, and includes an opening in communication with the internal passage defined by front section 52.

In a similar manner, central frame member rear section 54 defines a top wall 70, a pair of side walls 72, 74 and a bottom wall (not shown). The walls of central frame member rear section 54 as shown and described define an internal passage. Rear section 54 further includes an angled front end plate 76 welded to top wall 70, side wall 72, and the bottom wall of rear section 54. An opening 78 is formed in front end plate 76, establishing communication with the internal passage defined by central frame member rear section 54.

Central frame member 15 further defines a spanning side wall 80 which is formed integrally with side wall 74 of rear section 54 and with side wall 64 of front section 52.

Side wall 80 spans between and interconnects front and rear sections 52, 54, respectively. Front section rear end plate 68 is welded to the inside surface of side wall 80, as is rear section front end plate 76.

Side frame assembly 56 extends laterally outwardly from side wall 80, and includes a front cross-member 82, a rear cross-member 84 and an outer frame member 86 spanning between and interconnecting the outer ends of front and rear cross-members 82, 84, respectively. Similarly, side frame assembly 58 includes a front cross-member 88, a rear cross-member 90 and an outer frame member 92 extending between and interconnecting the outer ends of front and rear cross-members 88, 90, respectively. Preferably, front cross-member 82 of side frame assembly 56 and front cross-member 88 of side frame assembly 58 are formed integrally with each other, as are rear cross-members 84, 90 of side frame assemblies 56, 58, respectively. Front cross-member 82 is connected such as by welding to mounting structure associated with front section 52 of central frame member 15, and rear cross-member 84 is connected such as by welding to mounting structure associated with rear section 54, in order to mount side frame assemblies 56, 58 to central frame member 15.

A pair of cab mounts 94 are interconnected with side frame assembly 58 for mounting cab 22 thereto. In addition, side wall 80 includes a pair of bosses 96, to which the inner portion of cab 22 is mounted.

Side frame assembly 56, in combination with side wall 80, defines a drive train compartment which receives an engine 98, a transmission 100, and a power transfer mechanism 102. A radiator and oil cooler assembly 104 is mounted to side frame assembly 56 adjacent the end of engine 98 opposite power transfer mechanism 102.

Transmission I 00 extends along a longitudinal front-rear axis which is coincident with the longitudinal axis of central frame member 15. Engine 98 also extends along a longitu-dinal front-rear axis, which is parallel to the longitudinal axis of transmission 100. Power transfer mechanism 102 extends along a longitudinal axis perpendicular to the longitudinal axes of each of engine 98 and transmission 100, as well as to the longitudinal axis of central frame member 100.

Representatively, engine 98 may be that such as is available from John Deere & Company under its designation 4045TF. Transmission 100 may be that such as is available from Clark-Hurth of Statesville, N.C. under its designation T16000, and power transfer mechanism 102 may be a transfer case such as is available from Durst of Beloit, Wisconsin under its designation PR3730. In each case, it is understood that the specified manufacturers and model numbers are representative, and that other satisfactory components could be employed.

Power transfer mechanism 102 defines an external housing or casing 106, an engine coupling 108 and a transmission coupling 1O. In a manner as is known, engine coupling 108 is mounted to the structure of engine 98, and transmission coupling 1O is likewise mounted to the structure of transmission 100. In this manner, casing 106 of power transfer mechanism 102 functions to structurally interconnect the front end of engine 98 with the front end of transmission 100.

Power transfer mechanism 102 includes a power input which is drivingly engaged with the power output of engine 98 adjacent engine coupling 108. Similarly, power transfer mechanism 102 defines a power output adjacent transmission coupling 110, which is drivingly engaged with the power input of transmission 100. A rear drive shaft 112 is coupled to the power output of transmission 100, and extends through opening 78 in end plate 76 and into the internal passage defined by central frame member rear section 54. Drive shaft 112 is interconnected at its rearward end with a differential and rear wheels 20, for providing power to rear wheels 20 in a manner as is known. Similarly, a front drive shaft 113 is coupled to the power output of transmission 100, and extends through the opening in end plate 68 and into the internal passage defined by central frame member front section 52. Drive shaft 113 is interconnected at its forward end with a differential and front wheels 18, for providing power to front wheels 18 in a manner as is known.

Each of drive shafts 112, 113 extends along a longitudinal axis extending in a forward-rearward direction, which is coincident with the longitudinal axis along which central frame member 15 extends. Similarly, transmission 100 extends along a longitudinal front-rear axis coincident with the longitudinal axes of both drive shafts 112, 113 and central frame member 15. The longitudinal axis of engine 98 is parallel to that of transmission 100, and power transfer mechanism 102 extends perpendicularly to each of engine 98 and transmission 100. Engine coupling 108 and transmission coupling 110 are sized to accommodate an offset in the front-rear position of the front end of engine 98 relative to the front end of transmission 100, so as to enable power transfer casing 106 to be perpendicular to both engine 98 and transmission 100.

Figure 4:
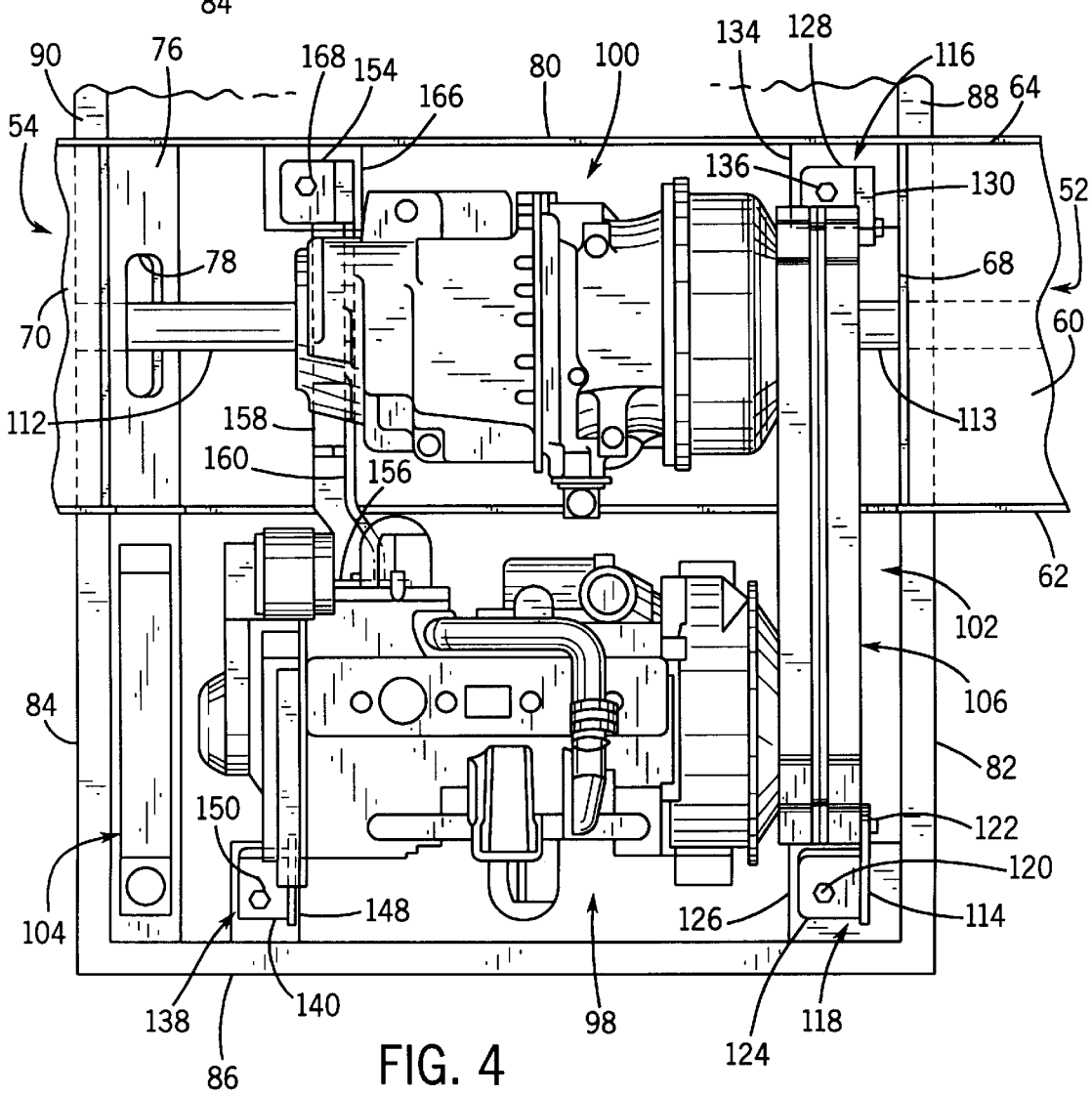
FIG. 4 is a top plan view of a portion of the vehicle frame assembly of FIG. 2, showing the drive train mounted to the vehicle frame assembly.
Figure 5:
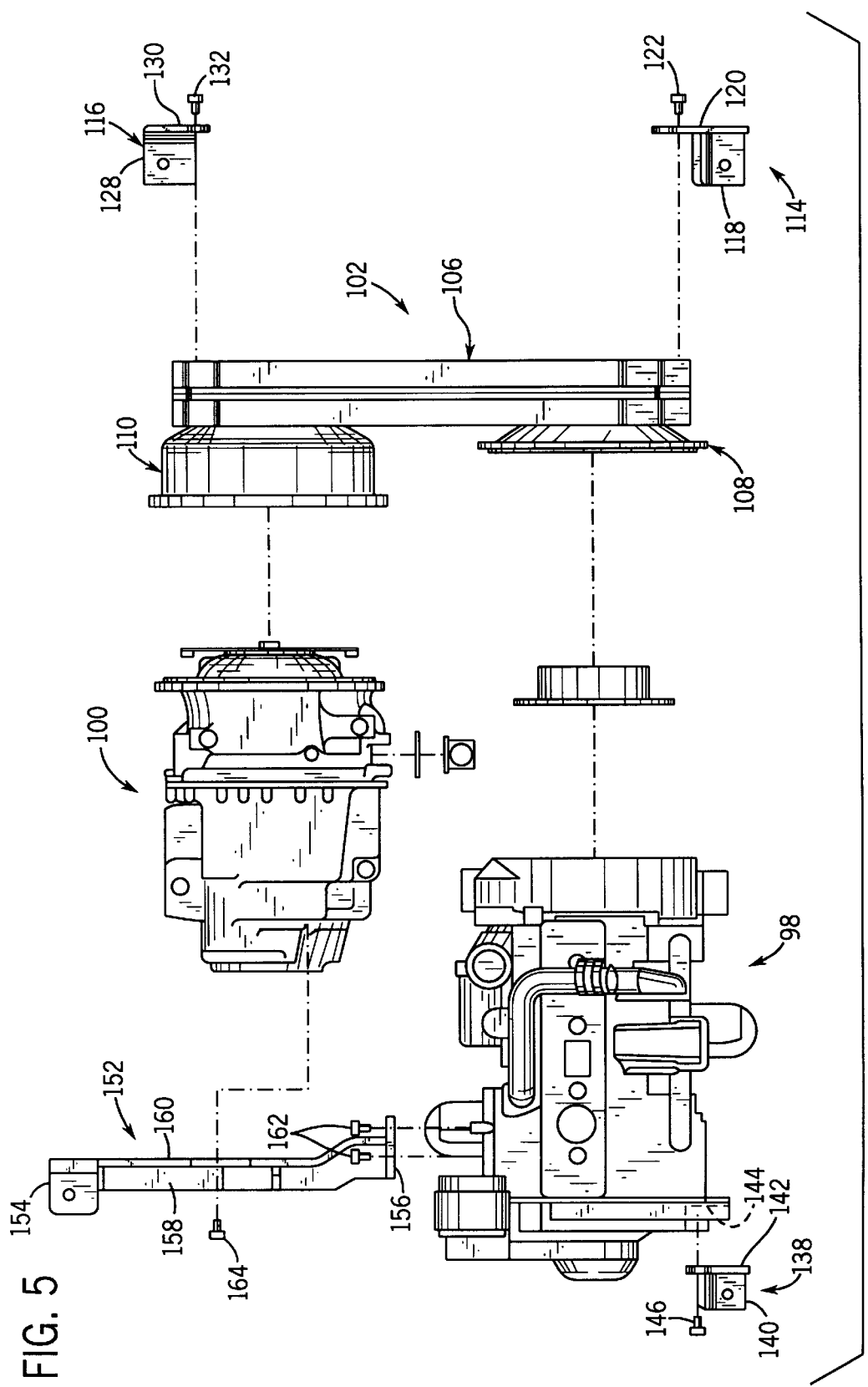
FIG. 5 is an exploded top plan view of the drive train as illustrated in FIG. 4.

Referring to FIGS. 4 and 5, a mounting bracket 114 is connected to the end of power transfer casing 106 adjacent engine 98. Similarly, a mounting bracket 116 is mounted to the end of power transfer casing 106 adjacent transmission 100.

Figure 3:
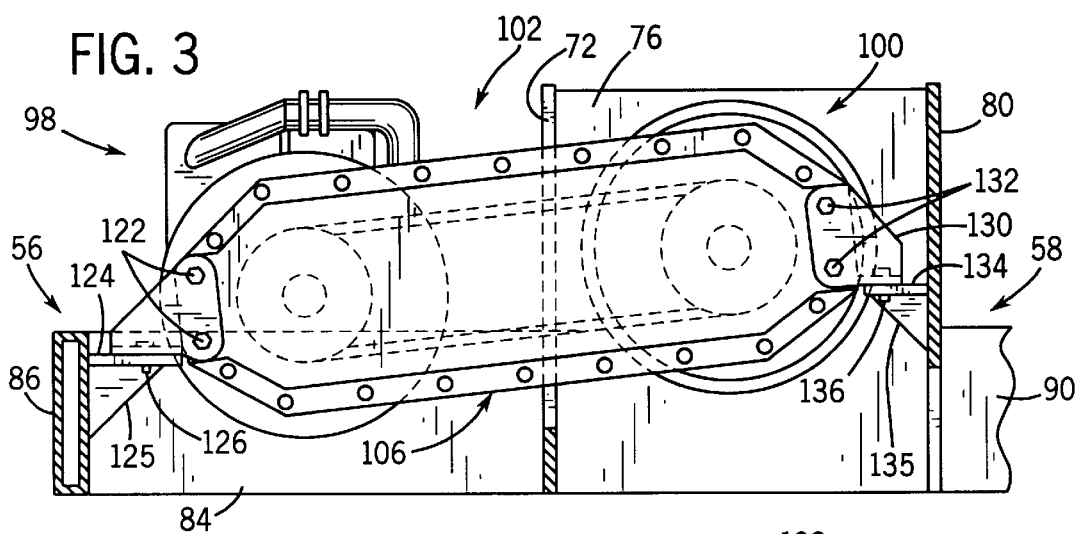
FIG. 3 is a partial section view taken along line 3—3 of FIG. 2.

Mounting bracket 114 defines a horizontal base section 118 and a vertical section 120 extending upwardly therefrom. As shown in FIG. 3, a pair of bolts 122 extend through openings formed in vertical section 120 and into threaded passages formed in power transfer casing 106, so as to secure mounting bracket 114 to power transfer casing 106. A support plate 124 is welded to the inside surface of each of front cross-member 82 and outer frame member 86 at the intersection therebetween, and is reinforced by a triangular reinforcing member 125. Mounting bracket 114 rests on support plate 124 such that horizontal base section 118 engages the upper surface of support plate 124, and a bolt 126 extends through aligned openings in horizontal base section 118 and support plate 124. A nut is engaged with bolt 126, so as to secure mounting bracket 114 to support plate 124 and to thereby support the outer end of power transfer casing 106 and the forward end of engine 98.

In a similar manner, mounting bracket 116 includes a horizontal base section 128 and a vertical section 130 extending upwardly therefrom. A pair of bolts 132 extend through openings formed in vertical section 130 and into threaded passages formed in power transfer casing 106, so as to secure mounting bracket 116 to power transfer casing 106. A support plate 134 is welded to side wall 80 and to rear end plate 68 of central frame member front section 52 at the intersection therebetween, and is reinforced by a triangular reinforcing member 135. Mounting bracket 116 is supported on support plate 134 by engagement of horizontal base section 128 with support plate 134. A bolt 136 extends through aligned openings in horizontal base section 128 and support plate 134, and a nut is engaged with bolt 136. In this manner, the forward end of transmission 100 and the inner end of power transfer casing 106 are supported by central frame member 15.

A rear mounting bracket 138 includes a horizontal base section 140 and an upstanding vertical wall 142, which is received within a mounting pocket 144 provided on engine 98. A pair of mounting bolts 146 extend through openings formed in vertical section 142 and into engagement with threaded passages in engine 98 in alignment with the openings in vertical section 142, so as to secure mounting bracket 138 to engine 98. A reinforced engine support plate 148 is connected such as by welding to the inside surface of outer frame member 86, and horizontal base section 140 of mounting bracket 138 rests on and is supported by support plate 148. A bolt 150 extends through aligned openings in horizontal base section 140 and support plate 148, and is engaged with a nut below support plate 148 so as to secure mounting bracket 138 to support plate 148. In this manner, engine 98 is supported at its rearward end by outer frame member 86 at a location spaced rearwardly from the support of the forward end of engine 98 by mounting bracket 114 and support plate 124.

A rear mounting member 152 interconnects the rearward ends of engine 98 and transmission 100 with central frame member 15. Rear mounting member 152 extends across transmission 100 adjacent its rearward end, and includes a horizontal inner end plate 154 and a vertical outer end plate 156. Rear mounting member 152 further includes a horizontal flange 158 and a vertical flange 160, which together define an L-shaped cross-section, extending between horizontal inner end plate 154 and vertical outer end plate 156. Openings are formed in outer end plate 156 in alignment with threaded passages in engine 98, and bolts 162 extend into the threaded passages in engine 98 so as to connect the outer end of mounting member 152 to engine 98. An opening is formed in vertical flange 160 approximately midway along its length, and a bolt 164 extends therethrough and into engagement with a threaded passage formed toward the rearward end of transmission 100, so as to secure rear mounting member 152 to transmission 100. As shown in FIG. 5, the outer end of rear mounting member 152 is laterally offset in a forward direction relative to the remainder of the length of rear mounting member 152, so as to accommodate certain components of engine 98 toward its rearward end.

Referring to FIG. 4, a reinforced support plate 166 is mounted to side wall 80 rearwardly of support plate 134. Horizontal inner end plate 154 of rear mounting member 152 is engaged with and supported by support plate 166, and a bolt 168 extends through aligned openings in inner end plate 154 and support plate 166. A nut is engaged with bolt 168, so as to securely mount the inner end of rear mounting member 152 to side wall 80 through support plate 166. With this arrangement, the rear end of transmission 100 is interconnected with central frame member 15. In addition, the rear end of transmission 100 is supported through rear mounting member 152 and engine 98 by outer frame member 86. Similarly, the rear end of engine 98 is supported by outer frame member 86 through mounting bracket 138 and support plate 148. The rear end of engine 98 is also supported through rear mounting member 152 by central frame member 15 through engagement of inner end plate 154 with support plate 166.

In assembly, power transfer casing 106 is engaged with engine 98 through engine coupling 108 and with transmission 100 through transmission coupling 110. In this manner, the front ends of engine 98 and transmission 100 are structurally secured together. Rear mounting member 152 is then engaged with engine 98 and transmission 100 as described, so as to assemble engine 98, transmission 100 and power transfer mechanism 102 into a subassembly. Mounting brackets 114 and 116 are then secured to power transfer casing 106 and mounting bracket 138 is secured to engine 98, as described above. The engine, transmission and power transfer mechanism subassembly is then lowered into the space defined by side frame assembly 56, such that mounting bracket 114 overlies support plate 126, mounting bracket 116 overlies support plate 134, mounting bracket 138 overlies support plate 148, and inner end plate 154 overlies support plate 166. Bolts 126, 136, 150 and 168 are then secured as described above, to securely mount the engine, transmission and power transfer mechanism subassembly to central frame member 15 and to side frame assembly 156. Drive shafts 112, 113 are then connected to transmission 100 in a manner as is known, and radiator and oil cooler assembly 104 is mounted to mounting structure associated with side frame assembly 56 rearwardly of engine 98, also in a manner as is known.

In operation, power from engine 98 is transferred from the engine output to the power input of power transfer mechanism 102, and through the power transfer arrangement associated with power transfer mechanism 102 within the interior of power transfer casing 106 to the output of power transfer mechanism 102 at transmission coupling 110. Power is then input to transmission 100, and is transferred to drive shafts 112, 113 for supplying power to front wheels 18 and rear wheels 20.

With this arrangement, engine 98 is positioned so as not to interfere with the placement of cab 22, while enabling power to be supplied to rear wheels 20 along a drive line coincident with the centerline of central frame member 15. In addition, engine 98 is in a relatively low position so as not to interfere with the visibility of the operator within cab 22. Further, the subassembly of engine 98, transmission 100 and power transfer mechanism 102 facilitates assembly of the drive train to the vehicle frame. Finally, the position of engine 98, transmission 100 and power transfer mechanism 102 facilitates servicing of these components by providing access to each from below the frame as well as from above.

Various alternatives and embodiments are contemplated as being within the scope of the following claims particularly pointing out and distinctly claiming the subject matter regarded as the invention.

I claim:

1. A power system for a vehicle having a central frame member extending along a longitudinal axis in a front-rear direction, comprising:
   an engine support frame mounted to and extending laterally from the central frame member,
   an engine mounted to the engine support frame and including an engine output, wherein the engine is laterally offset from the central frame member;
   a transmission interconnected with the central frame member, wherein the transmission includes an input and an output lying along an axis coincident with the longitudinal axis of the central frame member,
   wherein the engine and transmission are oriented in a side-by-side configuration, and
   a power transfer arrangement extending between and drivingly interconnected with the engine output and the transmission input for supplying power to the transmission from the engine;
   wherein the engine and the transmission each define first and second ends, and wherein the power transfer arrangement includes a structural power transfer casing which interconnects the first end of the engine with the first end of the transmission, wherein the structural power transfer casing defines a first end mounting area engaged with the central frame member and a second end mounting area engaged with the engine support frame, wherein engagement of the first and second end mounting areas with the central frame member and the engine support frame, respectively, is operable to support the first end of the engine and the first end of the transmission relative to the central frame member and the engine support frame.

2. The vehicle power system of claim 1, wherein the central frame member defines a forward portion and a rearward portion between which the engine support frame is located.

3. The vehicle power system of claim 2, wherein the central frame member rearward portion defines an internal passage, and wherein the transmission output is interconnected with a drive shaft which extends into the internal passage.

4. The vehicle power system of claim 3, wherein the central frame member includes a side wall extending between and forming a part of each of the central frame member forward and rearward portions, and wherein the engine support frame extends laterally from the side wall.

5. The vehicle power system of claim 4, further comprising a mounting member with which each of the engine and the transmission are interconnected at a location spaced from the power transfer casing.

6. A power system for a vehicle having a central frame member extending along a longitudinal axis in a front-rear direction, comprising:
   an engine support frame mounted to the central frame member;
   an engine mounted to the engine support frame and including an engine output, wherein the engine is laterally offset from the central frame member;
   a transmission mounted to the central frame member, wherein the transmission includes an input and an output lying along an axis coincident with the longitudinal axis of the central frame member;
   a power transfer arrangement extending between and drivingly interconnected with the engine output and the transmission input for supplying power to the transmission from the engine;
   wherein the engine and the transmission are oriented in a side-by-side configuration;
   wherein the engine and the transmission each define first and second ends and wherein the power transfer arrangement includes a power transfer casing which interconnects the first end of the engine with the first end of the transmission;
   support members mounted to the central frame member and the engine support frame; and
   a mounting member separate from the engine support frame and from the central frame member, wherein the mounting member is interconnected with both the engine and the transmission at a location spaced from the power transfer casing, wherein the power transfer casing is engaged with the support members mounted to the central frame member and to the engine support frame, and wherein the mounting member is engaged with at least one support member mounted to one of the central frame member and the engine support frame.

7. The vehicle power system of claim 6, wherein the mounting member is engaged with a support member mounted to the central frame member, and wherein the engine is also engaged with a support member mounted to the engine support frame.

8. A vehicle, comprising:
   a central frame member comprising a rear frame section carrying a set of rear wheels and a front frame section carrying a set of front wheels, wherein the central frame member extends along a longitudinal axis in a front-rear direction, wherein the front section and the rear section of the central frame member are spaced from each other and wherein the central frame member further includes a side wall member extending between and interconnected with the front and rear frame sections;
   a pair of side frame assemblies mounted to the central frame member and extending laterally therefrom in opposite directions;
   an operator cab mounted to a first one of the side frame assemblies;
   an engine mounted to a second one of the side frame assemblies, wherein the engine includes an output and extends along a front-rear axis laterally offset from the longitudinal axis of the central frame member;
   wherein the second side frame assembly is aligned with and extends laterally outwardly from the space between the front and rear sections of the central frame member;
   a transmission mounted to the central frame member within the space between the front and rear sections of the central frame member, wherein the transmission includes an output drivingly interconnected with the set of wheels, wherein the transmission includes an input laterally offset from the engine output; and
   a power transfer arrangement interposed between and drivingly interconnected with the engine output and the transmission input for supplying power to the transmission from the engine.

9. The vehicle of claim 12, wherein the transmission is interconnected with a forwardly extending drive shaft and a rearwardly extending drive shaft which are drivingly interconnected with forward and rearward sets of wheels, respectively, mounted to the front and rear sections, respectively, of the central frame member, and wherein the front and rear sections of the central frame member each defines an internal passage through which the respective forwardly and rearwardly extending drive shafts extend.

10. The vehicle of claim 9, wherein the transmission is oriented relative to the central frame member such that the forwardly and rearwardly extending drive shafts extend along the longitudinal axis of the central frame member.

11. The vehicle of claim 10, wherein the first side frame assembly extends from a first side of the central frame member and the second side frame assembly extends from a second side of the central frame member, and wherein the side wall member is located on the first side of the central frame member and the space between the front and rear sections of the central frame member is located toward the second side of the central frame member.

12. The vehicle of claim 11, wherein the rear section of the central frame member includes a front plate member and wherein the front section of the central frame member includes a rear plate member, wherein the front and rear plate members are spaced apart from each other and wherein each of the front and rear plate members includes an opening through which a respective forwardly and rearwardly extending drive shaft extends, wherein the forwardly and rearwardly extending drive shafts are interconnected with the transmission.

13. The vehicle of claim 12, wherein the power transfer arrangement includes a structural power transfer casing which interconnects a first end of the engine with a first end of the transmission, wherein the structural power transfer casing defines a first end mounting area engaged with the side wall member and a second end mounting area engaged with the second side frame assembly, wherein engagement of the first and second end mounting areas with the side wall member and the second frame assembly, respectively, is operable to support the first end of the engine and the first end of the transmission relative to the central frame member and the second frame assembly.

14. The vehicle of claim 13, wherein the engine and the transmission are interconnected with the central frame member by means of a mounting member secured to the side wall member and extending transversely outwardly therefrom within the space between the front and rear sections of the central frame member.

15. The vehicle of claim 14, wherein the mounting member defines an outer end interconnected with the engine and an inner end engaged with the side wall member, and wherein the mounting member supports the transmission intermediate its inner and outer ends.

16. The vehicle of claim 15, wherein the power transfer arrangement includes a structural power transfer casing which extends between and interconnects a first end of the engine with a first end of the transmission, wherein the structural power transfer casing is engaged at an outer end with the second side frame assembly and at an inner end with the central frame member, and wherein a second end of the engine is supported by an engine mount associated with the second side frame assembly in combination with a mounting member which is interconnected with the engine at an outer end thereof and with the central frame member at an inner end thereof, wherein the transmission is engaged with the mounting member intermediate its inner and outer ends.

17. The vehicle of claim 16, wherein the central frame member and the second side frame assembly are at substantially the same elevation relative to the vehicle in the vicinity of the space between the front and rear sections of the central frame assembly.

18. A vehicle, comprising:
a central frame member carrying a set of wheels, wherein the central frame member extends along a longitudinal axis in a front-rear direction;
a pair of side frame assemblies mounted to the central frame member and extending laterally therefrom in opposite directions;
an operator cab mounted to a first one of the side frame assemblies;
an engine mounted to a second one of the side frame assemblies, wherein the engine includes an output and extends along a front-rear axis laterally offset from the longitudinal axis of the central frame member;
a transmission mounted to the central frame member and including an output drivingly interconnected with the set of wheels, wherein the transmission includes an input laterally offset from the engine output; and
a power transfer arrangement interposed between and drivingly interconnected with the engine output and the transmission input for supplying power to the transmission from the engine;
wherein the power transfer arrangement includes a structural power transfer casing which extends between and interconnects a first end of the engine with a first end of the transmission, wherein the structural power transfer casing defines an inner end mounting area engaged with the central frame member and an outer end mounting area engaged with the second side frame assembly, to mount the transmission and the engine to the central frame member and the second side frame assembly.

19. The vehicle of claim 18, wherein the central frame member comprises a rear frame section carrying a set of rear wheels and a front frame section carrying a set of front wheels, wherein the front and rear sections are spaced from each other and wherein the central frame member further includes a side wall member extending between and interconnected with the front and rear frame sections, wherein the inner end mounting area of the structural power transfer casing is engaged with the side wall member of the central frame member.

20. The vehicle of claim 19, wherein the second side frame assembly is aligned with and extends laterally outwardly from the space between the front and rear sections of the central frame member.

21. The vehicle of claim 20, wherein the second side frame assembly comprises spaced front and rear laterally extending frame members, each of which defines an outer end, and wherein the outer ends of the front and rear laterally extending frame members are interconnected with an outer frame member extending therebetween.

22. The vehicle of claim 21, wherein the outer end mounting area of the structural power transfer casing is engaged with the outer frame member of the second side frame assembly.

23. The vehicle of claim 22, wherein the transmission is interconnected with a forwardly extending drive shaft and a rearwardly extending drive shaft which are drivingly interconnected with respective forward and rearward sets of wheels mounted to the front and rear sections, respectively, of the central frame member, and wherein the front and rear sections of the central frame member each defines an internal passage through which the respective forwardly and rearwardly extending drive shafts extend.

24. The vehicle of claim 23, wherein a second end of the engine is supported by an outer end mount interposed between the engine and the second side frame assembly, in combination with a mounting member which extends between and is interconnected with the engine and the side wall member of the central frame member.

25. The vehicle of claim 24, wherein the transmission is engaged with the mounting member at a location spaced from the power transfer casing, wherein the power transfer casing and the mounting member are operable to support the transmission relative to the central frame member.

* * * * *

UNITED STATES PATENT AND TRADEMARK OFFICE
CERTIFICATE OF CORRECTION

PATENT NO.   : 6,152,253
DATED        : November 28, 2000
INVENTOR(S)  : Merrick O. Monaghan It is certified that error appears in the above-identified patent and that said Letters Patent is hereby corrected as shown below:

Claims,
Column 9, claim 1,
Lines 6 and 13, after "member" delete "," and substitute therefor -- ; --;

Column 9, claim 5,
Line 48, delete "4" and substitute therefor -- 1 --;

Column 10, claim 6,
Line 4, after "ends" insert -- , --;

Column 10, claim 9,
Line 58, delete "12" and substitute therefor -- 8 --;

Column 11, claim 11,
Line 5, delete "10" and substitute therefor -- 8 --;

Column 11, claim 13,
Line 23, delete "12" and substitute therefor -- 11 --;

Column 11, claim 14,
Line 35, delete "13" and substitute therefor -- 8 --;

Column 11, claim 16,
Line 46, delete "15" and substitute therefor -- 8 --;

Column 11, claim 17,
Line 60, delete "16" and substitute therefor -- 8 --;

Column 12, claim 23,
Line 49, delete "22" and substitute therefor -- 21 --;

UNITED STATES PATENT AND TRADEMARK OFFICE
CERTIFICATE OF CORRECTION

PATENT NO. : 6,152,253
DATED : November 28, 2000
INVENTOR(S) : Merrick O. Monaghan It is certified that error appears in the above-identified patent and that said Letters Patent is hereby corrected as shown below:

<u>Column 12, claim 24,</u>
Line 58, delete "22" and substitute therefor -- 21 --;

Signed and Sealed this

Sixth Day of November, 2001

Attest:

NICHOLAS P. GODICI
Attesting Officer     *Acting Director of the United States Patent and Trademark Office*